United States Patent
Xu et al.

(10) Patent No.: US 9,533,848 B2
(45) Date of Patent: Jan. 3, 2017

(54) CHEQUE PROCESSING DEVICE

(71) Applicant: SHANDONG NEW BEIYANG INFORMATION TECHNOLOGY CO., LTD, Weihai (CN)

(72) Inventors: Qingbang Xu, Weihai (CN); Shuxun Dong, Weihai (CN); Daxiang Chen, Weihai (CN); Feng Wang, Weihai (CN)

(73) Assignee: Digital Check Corporation, Northbrook, IL (US)

( * ) Notice: Subject to any disclaimer, the term of this patent is extended or adjusted under 35 U.S.C. 154(b) by 12 days.

(21) Appl. No.: 14/418,395

(22) PCT Filed: Aug. 19, 2013

(86) PCT No.: PCT/CN2013/081726
§ 371 (c)(1),
(2) Date: Jan. 29, 2015

(87) PCT Pub. No.: WO2014/029304
PCT Pub. Date: Feb. 27, 2014

(65) Prior Publication Data
US 2015/0151936 A1    Jun. 4, 2015

(30) Foreign Application Priority Data
Aug. 24, 2012    (CN) .......................... 2012 1 0307557

(51) Int. Cl.
*B65H 5/06*        (2006.01)
*B41J 13/12*       (2006.01)
(Continued)

(52) U.S. Cl.
CPC ................. *B65H 5/06* (2013.01); *B41J 13/12* (2013.01); *B65H 1/022* (2013.01); *B65H 3/0653* (2013.01);
(Continued)

(58) Field of Classification Search
CPC ........... B65H 5/002; B65H 5/06; B65H 5/062; B65H 2301/31124; B65H 2301/44318; B65H 2402/441; B65H 2404/142; B65H 2404/144; B65H 2404/152; B65H 2404/1421; B65H 2404/1521; B65H 2511/528; B65H 2601/11; B65H 2601/321; B65H 2601/324; G07D 11/0081; G07D 11/0084; G07D 11/0021; G06K 13/16
See application file for complete search history.

(56) References Cited

U.S. PATENT DOCUMENTS 4,934,847 A    6/1990 Shiozaki et al.
6,772,886 B2 *  8/2004 Werner et al. ................ 209/534
(Continued)

FOREIGN PATENT DOCUMENTS

CN    101722735 A    6/2010
CN    102152658 A    8/2011
(Continued)

OTHER PUBLICATIONS

International Search Report for counterpart PCT Application No. PCT/CN2013/081726, dated Nov. 28, 2013 (8 pgs.).

*Primary Examiner* — Ernesto Suarez
(74) *Attorney, Agent, or Firm* — K&L Gates LLP

(57) ABSTRACT

Disclosed is a cheque processing device, including: a base, a frame located at the top face of the base and forming a U-shaped paper passage, and multiple sets of conveying roller assemblies (9) and multiple processing mechanisms provided along the U-shaped paper passage, wherein one end of the U-shaped paper passage is an inlet and the other end is an outlet. The frame comprises a fixed frame body, and a first movable frame body and a second movable frame body which form the U-shaped paper passage together with the fixed frame body, wherein the first movable frame body (Continued)

and the second movable frame body can both pivot on the base to open and close with respect to the fixed frame body.

8 Claims, 7 Drawing Sheets

(51) Int. Cl.
G06K 9/18 (2006.01)
B65H 29/12 (2006.01)
B65H 1/02 (2006.01)
B65H 3/06 (2006.01)
B65H 3/52 (2006.01)
G07D 7/12 (2016.01)

(52) U.S. Cl.
CPC ............ *B65H 3/5207* (2013.01); *B65H 5/062* (2013.01); *B65H 29/125* (2013.01); *G06K 9/186* (2013.01); *G07D 7/12* (2013.01); *B65H 2301/3122* (2013.01); *B65H 2301/321* (2013.01); *B65H 2402/441* (2013.01); *B65H 2402/46* (2013.01); *B65H 2404/6111* (2013.01); *B65H 2601/11* (2013.01); *B65H 2701/1912* (2013.01)

(56) References Cited

U.S. PATENT DOCUMENTS

| | | | |
|---|---|---|---|
| 7,477,427 B2* | 1/2009 | Fujikawa | B41J 3/44 |
| | | | 235/454 |
| 7,717,345 B2* | 5/2010 | Endo | 235/475 |
| 7,837,109 B2* | 11/2010 | Fujikawa et al. | 235/445 |
| 7,988,151 B2* | 8/2011 | Kinoshita | B65H 29/58 |
| | | | 271/303 |
| 8,020,771 B2* | 9/2011 | Kinoshita et al. | 235/475 |
| 8,955,663 B2* | 2/2015 | Toshima | 194/210 |
| 2004/0257626 A1* | 12/2004 | Panini et al. | 358/474 |
| 2012/0212541 A1* | 8/2012 | Sasaki | 347/29 |

FOREIGN PATENT DOCUMENTS

| | | |
|---|---|---|
| CN | 102241202 A | 11/2011 |
| JP | 4246843 B2 | 4/2009 |

* cited by examiner

CHEQUE PROCESSING DEVICE

This application is a national stage entry under 35 U.S.C. 371 of PCT Application No. PCT/CN2013/081726 filed on Aug. 19, 2013 in the name of Shandong New Beiyang Information Technology Co., LTD., which claims priority to Chinese Invention Patent Application No. 201210307557.0, entitled "Cheque Processing Device", filed in State Intellectual Property Office on Aug. 24, 2012, the disclosure of which is incorporated herein in its entirety by reference.

TECHNICAL FIELD OF THE INVENTION

The invention relates to a cheque processing device.

BACKGROUND OF THE INVENTION

Existing cheque processing device comprises a reading magnetic mechanism, a printing mechanism and a scanning mechanism. When users such as retail stores, banks or the like receive a cheque, the reading magnetic mechanism of the cheque processing device first reads magnetic ink character information (simply MICR character information for short) recorded on the front of the cheque, and the MICR character information is compared with an account information in a bank cheque management system to confirm whether the cheque is valid. After the cheque is confirmed to be valid, the printing mechanism of the cheque processing device is used to print endorsement information such as the name of a user or a company receiving the cheque on the back of the cheque. Finally, the scanning mechanism of the cheque processing device is used to scan the image on the front and/or back of the cheque, and the image information obtained is archived.

The relevant technology provides a cheque processing device. As shown in FIG. 1, the cheque processing device is provided with a curved channel 5', one end of which is in communication with an inlet 6' and the other end of which is in communication with an outlet 7'. A reading magnetic mechanism, a printing mechanism and a scanning mechanism (not shown in the figure) are orderly provided along the direction in which the cheque is conveyed within the curved channel 5'. The problem with the cheque processing device is that the whole machine needs to be disassembled when the reading magnetic mechanism, the scanning mechanism and the printing mechanism provided along the curved channel are maintained. Therefore, there is a problem of inconvenient maintenance.

SUMMARY OF THE INVENTION

The goal of the invention is to provide a cheque processing device which is convenient to maintain.

To this end, the invention provides a cheque processing device, including: a base, a frame located at the top face of the base and forming a U-shaped paper passage, and multiple sets of conveying roller assemblies and multiple processing mechanisms provided along the U-shaped paper passage, wherein one end of the U-shaped paper passage is an inlet and the other end is an outlet, wherein the frame comprises a fixed frame body, and a first movable frame body and a second movable frame body which are on the outside of the fixed frame body and form the U-shaped paper passage together with the fixed frame body, the first movable frame body and the second movable frame body can both pivot on the base to open and close with respect to the fixed frame body, wherein all or some of the multiple sets of conveying roller assemblies and the multiple processing mechanisms are in an exposed state when the first movable frame body and the second movable frame body are opened with respect to the fixed frame body.

Further, the first movable frame body is L-shaped as a whole and extends along a first side and a second side of the fixed frame body, and the second movable frame body is I-shaped as a whole and extends along a third side of the fixed frame body, wherein the first side, the second side and the third side of the fixed frame body are connected end to end orderly and U-shaped.

Further, a straight channel is formed between the second movable frame body and the fixed frame body, and an inlet of the straight channel is formed between the first movable frame body and the second movable frame body.

Further, the pivoting position of the first movable frame body is close to the inlet of the U-shaped paper passage, and the pivoting position of the second movable frame body is close to the inlet of the straight channel.

Further, a scanning mechanism is provided in the straight channel, and the scanning mechanism includes a first scanning module configured to scan an image on a first face of a cheque and a second scanning module configured to scan an image on a second face of the cheque.

Further, a reading magnetic mechanism and a printing mechanism are provided between the inlet of the U-shaped paper passage and the straight channel orderly.

Further, the processing mechanisms and the conveying roller assemblies located at the first side and/or the second side of the fixed frame body are all provided on the fixed frame body and/or the base.

Further, the cheque processing device further includes a paper pick-up mechanism provided at the inlet of the U-shaped paper passage, wherein the paper pick-up mechanism includes a paper-fetching roller, a movable platen, and an elastic element configured to bias the platen to the paper-fetching roller.

Further, the cheque processing device further includes a paper-separating mechanism located downstream of the paper pick-up mechanism, wherein the paper-separating mechanism includes a paper-separating roller and a paper-pressing member.

Further, the cheque processing device further includes a third frame body forming an accommodating groove between the outlet of the U-shaped paper passage and the fixed frame body, wherein a stop lever is provided at a gap of the accommodating groove.

By means of the cheque processing device provided by the invention, when the first movable frame body and the second movable frame body are closed with respect to the fixed frame body, the first movable frame body and the second movable frame body are abutted in a U shape, located on the outside of the fixed frame body, and the first movable frame body and the second movable frame body form a U-shaped paper passage together with the fixed frame body. When the first movable frame body is opened with respect to the fixed frame body, the component provided between the first movable frame body and the fixed frame body may be exposed. When the second movable frame body is opened with respect to the fixed frame body, the component provided between the second movable frame body and the fixed frame body may be exposed. Therefore, each component in the U-shaped paper passage of the cheque processing device may be replaced or cleaned conveniently or the jammed cheques may be sorted out conveniently. Thus, compared with the prior art, the cheque processing device provided by the invention has the advantages of good maintainability and convenient maintenance.

In addition to the objects, features and advantages described above, the other objects, features and advantages of the invention will be further described in detail in conjunction with the accompanying drawings.

BRIEF DESCRIPTION OF THE DRAWINGS

The accompanying drawings, which constitute a part of this application and serve to provide a further understanding of the invention illustrate the preferred embodiments of the invention, and together with the description serve to explain the principles of the invention. In the drawings.

REFERENCE NUMERALS

Figure 1:
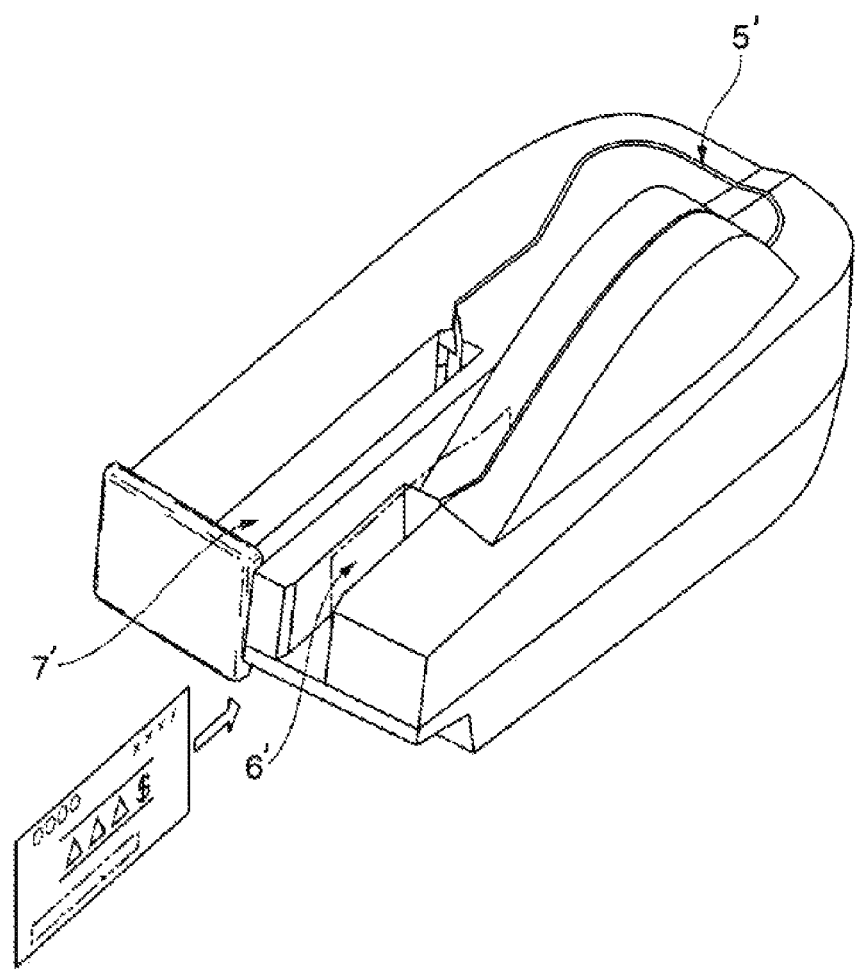
FIG. 1 is a structural diagram of a cheque processing device provided by the relevant technology.

80 Base
81 Fixed frame body
82 First movable frame body
83 Second movable frame body
821 First pivoting shaft
831 Second pivoting shaft
100 Reading magnetic mechanism
200 Printing mechanism
300 Scanning mechanism
9 Conveying roller group
91 Driving roller
92 Driven roller
201 Ink cartridge
310 First scanning module
320 Second scanning module
311 First image sensor
312 First paper-pressing member
321 Second mage sensor
322 Second paper-pressing member
1 Paper pick-up mechanism
2 Paper-separating mechanism
11 Paper-fetching roller
12 Platen
13 Elastic element
21 Paper-separating roller
22 Paper-pressing member
841 Accommodating groove
84 Third frame body
842 Stop lever

DETAILED DESCRIPTION OF THE EMBODIMENTS

The embodiments of the invention will be described below in detail in conjunction with the accompanying drawings, but the invention may be implemented in many different ways defined and covered by Claims.

Figure 2:
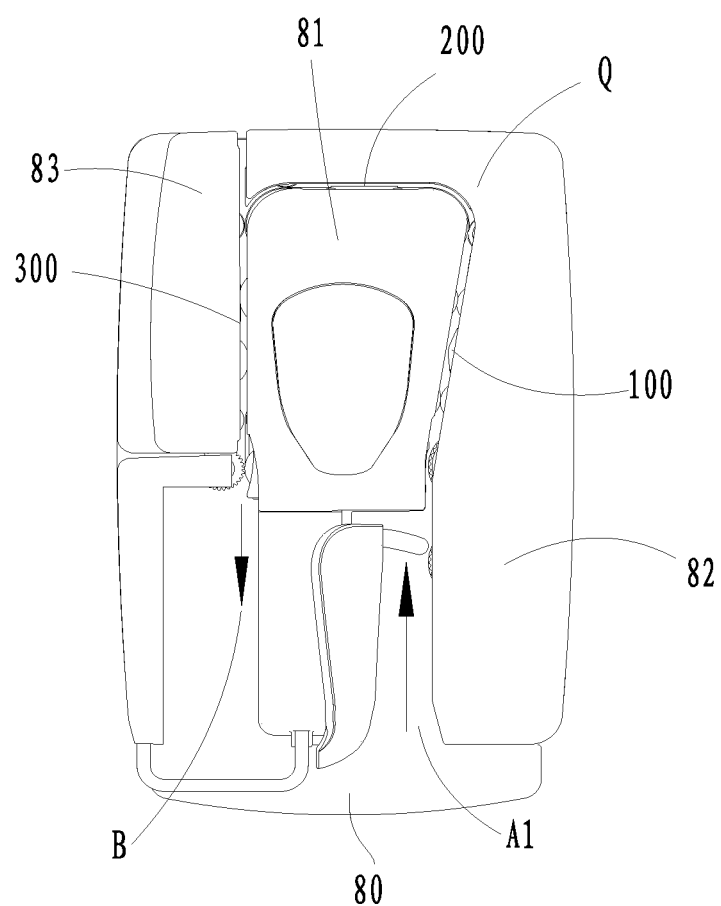
FIG. 2 is a top view of a cheque processing device according to a first embodiment of the invention, wherein a first movable frame body and a second movable frame body are closed with respect to a fixed frame body.
Figure 3:
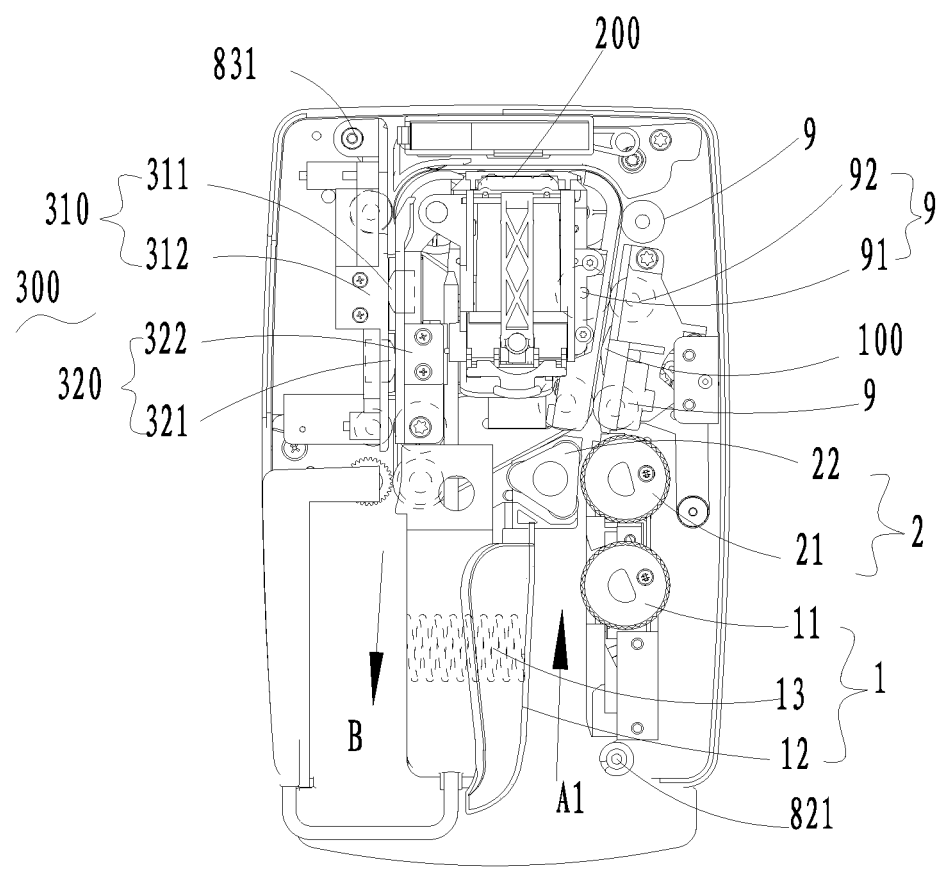
FIG. 3 is a diagram of an internal structure of a cheque processing device according to a first embodiment of the invention.

FIG. 2 is a top view of a cheque processing device according to a first embodiment of the invention, wherein a first movable frame body and a second movable frame body are closed with respect to a fixed frame body. FIG. 3 is a diagram of an internal structure of a cheque processing device according to a first embodiment of the invention. As shown in FIG. 2 and FIG. 3, the cheque processing device comprises a base 80, a fixed frame body 81, a first movable frame body 82 and a second movable frame body 83, wherein the fixed frame body 81 is fixedly connected with the base 80, located in the middle of the base 80, and the fixed frame body 81 is rectangular.

The first movable frame body 82, which is located on one side of the fixed frame body 81 and pivots the base 80 through a first pivoting shaft 821, is rotatable around the first pivoting shaft 821 and is opened or closed with respect to the fixed frame body 81. The second movable frame body 83, which is located on the other side of the fixed frame body 81 and pivots the base 80 through a second pivoting shaft 831, is rotatable around the second pivoting shaft 831 and is opened or closed with respect to the fixed frame body 81. When the first movable frame body 82 and the second movable frame body 83 are closed with respect to the fixed frame body 81, the first movable frame body 82 and the second movable frame body 83 are abutted in a U shape, located on the outside of the fixed frame body 81, opposite to the three adjacent sides of the fixed frame body 81, thereby forming a U-shaped paper passage Q. The starting end of the U-shaped paper passage Q is connected with an inlet A1, and the tail end is connected with an outlet B. The cheque is fed from the inlet A1, and discharged from the outlet B after conveying around the U-shaped channel.

When the first movable frame body 82 is opened with respect to the fixed frame body 81, the component provided between the first movable frame body 82 and the fixed frame body 81 may be exposed. When the second movable frame body 83 is opened with respect to the fixed frame body 81, the component provided between the second movable frame body 83 and the fixed frame body 81 may be exposed.

In the embodiment, the first movable frame body 82 is L-shaped and extends along a first side and a second side of the fixed frame body 81, and the second movable frame body 83 is I-shaped and extends along a third side of the fixed frame body 81, wherein the first side, the second side and the third side of the fixed frame body 81 are connected end to end orderly and U-shaped. Therefore, when the first movable frame body 82 and the second movable frame body 83 are both closed with respect to the fixed frame body 81, the first movable frame body 82 and the second movable frame body 83 are connected in a U shape and surround the outside of the fixed body 81. In other embodiments of the invention, it is possible that the first movable frame body 82 is I-shaped and the second movable frame body is L-shaped, alternatively, the first movable frame body 82 and the second movable frame body 83 are both L-shaped, and located on the outside of the fixed frame body 81 in a U shape when both closed with respect to the fixed frame body.

A reading magnetic mechanism 100, a printing mechanism 200, a scanning mechanism 300 and multiple sets of conveying roller assemblies 9 are provided on the U-shaped paper passage orderly along the cheque conveying direction, wherein the reading magnetic mechanism 100 is configured to identify the authenticity of the cheque, the printing mechanism 200 is configured to print endorsement information on the back of the cheque, the scanning mechanism 300 is configured to obtain the image on the surface of the cheque, and the conveying roller assemblies 9 are configured to drive the cheque to move along the U-shaped paper passage.

Preferably, each set of conveying roller assemblies 9 comprises a driving roller 91 and a driven roller 92 located on the both sides of the U-shaped paper passage Q and provided tangently. When a driving mechanism drives the driving roller 91 to rotate, the cheque located between the driving roller 91 and the driven roller 92 may be driven to move along the U-shaped paper passage Q. In the embodiment, the driving roller 91 and the driven roller 92 of the conveying roller assemblies 9 located between the first movable frame body 82 and the fixed frame body 81 are both supported by the fixed frame body 81, wherein the driving roller 91 is provided on one side of the U-shaped paper passage Q away from the first movable frame body 82, and the driven roller 92 is provided on the other side of the U-shaped paper passage Q adjacent to the first movable frame body 82. The driving roller 91 of the conveying roller assemblies 9 located between the second movable frame body 83 and the fixed frame body 81 is provided on one side of the U-shaped paper passage Q away from the second movable frame body 83, and the driven roller 92 is provided on the other side of the U-shaped paper passage Q adjacent to the second movable frame body 83, wherein the driving roller 91 of the conveying roller assemblies 9 is supported by the fixed frame body 81, and the driven roller 92 is supported by the second movable frame body 83.

The reading magnetic mechanism 100 comprises a magnetic head, which is installed on the fixed frame body 81 and located on one side of the U-shaped paper passage Q. In the embodiment, the magnetic head is located on one side of the U-shaped paper passage Q adjacent to the first movable frame body 82. Two conveying roller assemblies 9 are respectively provided on the upstream and downstream of the magnetic head along the cheque conveying direction. An identification face of the magnetic head is located on a connecting line between tangency points of the driving roller 91 and the driven roller 92 of the two sets of conveying roller assemblies 9. When the cheque passes through the magnetic head, the identification face of the magnetic head contacts the surface of the cheque and may read magnetic information on the surface of the cheque for validating the validity of the cheque. In other embodiments provided by the invention, the reading magnetic mechanism 100 may further comprises a paper-pressing member provided opposite to the other side of the magnetic head. The magnetic head and the surface of the cheque may contact reliably when the cheque passes between the paper-pressing member and the magnetic head.

The printing mechanism 200 may be an ink-jet printing mechanism, and may also be an impact printing mechanism, a thermal printing mechanism or a laser printing mechanism. In the embodiment, the printing mechanism 200 is ink-jet printing mechanism, comprising an ink cartridge 201. The ink cartridge 201 is installed on the fixed frame body 81, located on the other side of the U-shaped paper passage Q with respect to the magnetic head. When the cheque passes through the ink cartridge 201, a nozzle of the ink cartridge 201 may print visible information (such as endorsement or the like) on the surface of the cheque. The traditional thermal printing apparatus, impact printing apparatus and laser printing apparatus is known to those skilled in the art and not repeated here. In the embodiment, the ink cartridge 201 is located on one side of the U-shaped paper passage Q away from the first movable frame body 82, and a notch (not shown in the figure) is provided on the other side of the U-shaped paper passage Q opposite to the ink cartridge 201, so that the ink cartridge 201 can be completely exposed for replacement when the first movable frame body 82 is opened with respect to the fixed frame body 81.

The scanning mechanism 300 comprises at least one set of scanning modules, wherein the scanning module comprises an image sensor configured to obtain the image on the surface of the cheque. The image sensor may be a contact image sensor, an electric coupling image sensor or other devices. In the embodiment, the scanning mechanism 300 comprises a first scanning module 310 and a second scanning module 320, both of which are arranged orderly in the U-shaped paper passage Q along the cheque conveying direction.

The first scanning module 310 comprises a first image sensor 311 and a first paper-pressing member 312 provided oppositely. When the cheque passes between the first image sensor 311 and the first paper-pressing member 312, the first image sensor 311 may scan the image on the first face of the cheque.

The second scanning module 320 comprises a second image sensor 321 and a second paper-pressing member 322 provided oppositely. When the cheque passes between the second image sensor 321 and the second paper-pressing member 322, the second image sensor 321 may scan the image on the second face of the cheque. When the second movable frame body 83 is opened with respect to the fixed frame body 81, the first image sensor 311 and the first paper-pressing member 312 as well as the second image sensor 321 and the second paper-pressing member 322 are separated respectively.

In the embodiment, the first image sensor 311 is installed on the fixed frame body 81, opposite to the first face of the cheque. The first paper-pressing member 312 is installed on the second movable frame body 83, the second image sensor 321 is installed on the second movable frame body 83, opposite to the second face of the cheque, and the second paper-pressing member 322 is installed on the fixed frame body 81.

It should be noted that, in the embodiment, both of the first image sensor 311 and the second image sensor 321 are contact image sensors. In order to ensure that the cheque contacts the image sensor closely, the paper-pressing member is provided. In other embodiments provided by the invention, when the scanning mechanism adopts the electric coupling image sensor as the image scanning device, it is unnecessary to provide the paper-pressing member opposite to the electric coupling image sensor.

When the first movable frame body 82 is opened with respect to the fixed frame body 81, the components such as the magnetic head, the ink cartridge 201 and each driven roller 92 located between the first movable frame body 82 and the fixed frame body 81 are exposed completely. At this time, it is convenient to replace the ink cartridge 201 and maintain the components such as the magnetic head and each driven roller 92 or the like. When the second movable frame body 83 is opened with respect to the fixed frame body 81, the first scanning module 310 and the second scanning module 320 located between the second movable frame body 83 and the fixed frame body 81 are exposed completely. At this time, it is convenient to maintain the components such as the first image sensor 311, the second image sensor 321 or the like.

Figure 4:
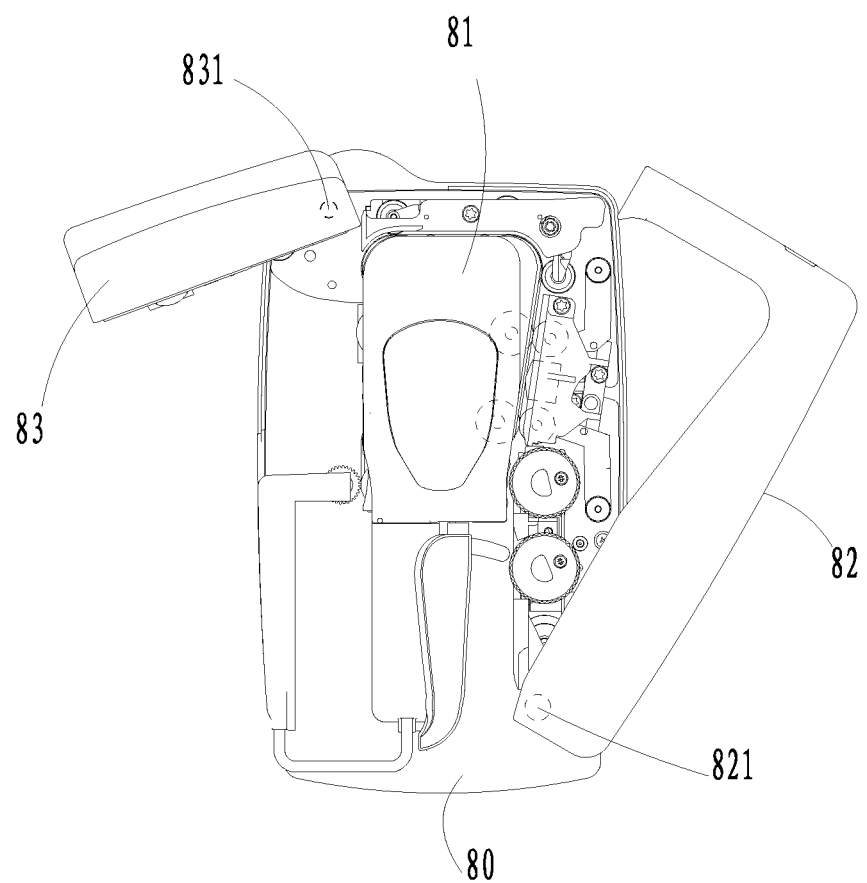
FIG. 4 is a top view of a cheque processing device according to a first embodiment of the invention, wherein a first movable frame body and a second movable frame body are opened with respect to a fixed frame body.
Figure 5:
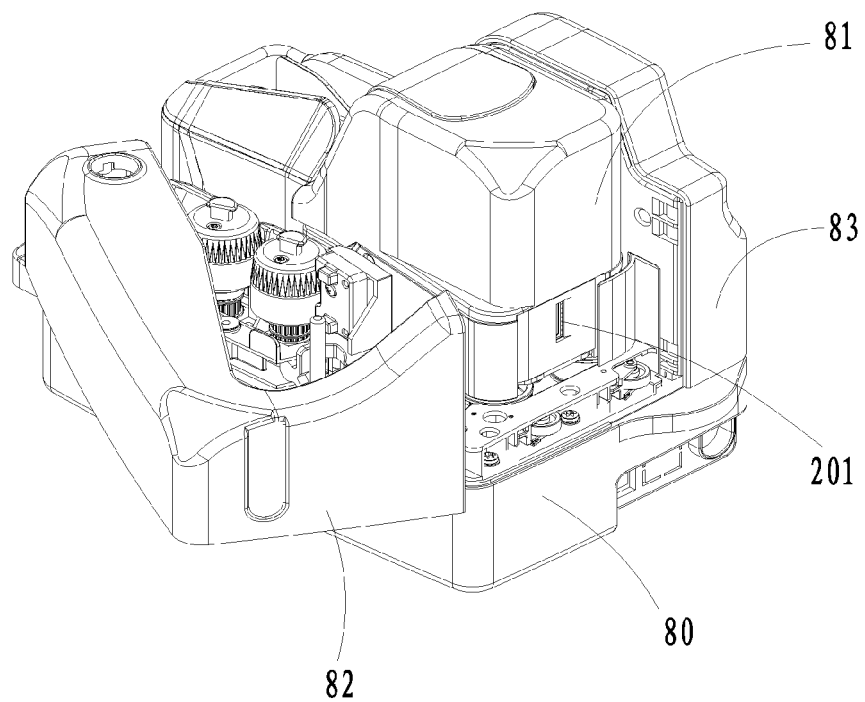
FIG. 5 is elevation I of a cheque processing device according to a first embodiment of the invention.

Preferably, when the first movable frame body 82 is L-shaped, the first pivoting shaft 821 is located on the initial end adjacent to an L-shaped long side of the first movable frame body, that is, one end of the movable frame body 82 adjacent to the inlet A1 of the U-shaped paper passage Q as shown in FIG. 4, so that when the first movable frame body 82 is opened at a small angle with respect to the fixed frame body 81, space for maintenance may be reduced while the components located on one side of the U-shaped paper passage Q are exposed completely.

Preferably, the second pivoting shaft 831 is located so that the second movable frame body 83 is opened towards an operator. When the second movable frame body 83 is opened with respect to the fixed frame body 81, the components of the first scanning module 310 and the second scanning module 320 may be exposed to the operator completely.

In other embodiments provided by the invention, the magnetic head may be provided on one side of the U-shaped paper passage Q away from the first movable frame body 82, and the ink cartridge 201 is provided on the side of the U-shaped paper passage Q adjacent to the first movable frame body 82.

In a working state, as shown in FIG. 2, the first movable frame body 82 is closed with respect to the fixed frame body 81, and the second movable frame body 83 is closed with respect to the fixed frame body 81. At this time, the cheque is fed into the U-shaped paper passage Q by the inlet A1, and passes through the reading magnetic mechanism 100, printing mechanism 200 and scanning mechanism 300 orderly. When the cheque passes through the reading magnetic mechanism 100, the magnetic head reads the magnetic information on the front of the cheque for validating the validity of the cheque. When the cheque is validated to be valid, the cheque is conveyed to the printing mechanism 200 by the conveying roller group 9. The ink cartridge 201 of the printing mechanism 200 prints the endorsement information on the back of the cheque. The cheque in which the endorsement is finished is conveyed to the scanning mechanism 300. The first scanning module 310 and the second scanning module 320 of the scanning mechanism 300 scan the images on the front and back of the cheque respectively and the images obtained are archived.

When the components of the printing mechanism 200 and the reading magnetic mechanism 100 need to be maintained, the first movable frame body 82 is opened with respect to the fixed frame body 81, so that the components such as the magnetic head, the ink cartridge 201, the driven roller 92 or the like located between the first movable frame body 82 and the fixed frame body 81 are exposed completely. At this time, maintenance operation such as cleaning, replacing or the like can be performed conveniently.

When the components of the scanning mechanism 300 need to be maintained, the second movable frame body 83 is opened with respect to the fixed frame body 81, so that the first scanning module 310 and the second scanning module 320 located between the second movable frame body 83 and the fixed frame body 81 are exposed completely. At this time, maintenance operation such as cleaning, replacing or the like can be performed conveniently.

By means of the cheque processing device provided by the invention, when the first movable frame body and the second movable frame body are closed with respect to the fixed frame body, the first movable frame body and the second movable frame body are abutted in a U shape, located on the outside of the fixed frame body, and the first movable frame body and the second movable frame body form a U-shaped paper passage together with the fixed frame body. When the first movable frame body is opened with respect to the fixed frame body, the component provided between the first movable frame body and the fixed frame body may be exposed. When the second movable frame body is opened with respect to the fixed frame body, the component provided between the second movable frame body and the fixed frame body may be exposed. Thus, compared with the prior art, the cheque processing device provided by the invention has good maintainability, and is convenient for replacing or cleaning each components in the U-shaped paper passage of the cheque processing device, and cleaning up the cheque jammed in the U-shaped paper passage.

Further, as shown in FIG. 3, a paper pick-up mechanism 1 and a paper-separating mechanism 2 are orderly provided on one end of the U-shaped paper passage Q adjacent to the inlet A1 along the cheque conveying direction.

The paper pick-up mechanism 1 comprises a paper-fetching roller 11, a platen 12, a platen driving component (not shown in the figure) and an elastic element 13. The paper-fetching roller 11 is supported by the fixed frame body 81, located on one side of the passage, the axis of which is parallel to the axis of the first pivoting shaft 821. The paper-fetching roller 11 is connected with a driving mechanism (not shown in the figure) in a transmission way. Under the drive of the driving mechanism, the paper-fetching roller 11 is rotatable around its own axis, a force of friction between the paper-fetching roller 11 and the cheque is greater than that between the cheques. The platen 12 is movably connected with the fixed frame body 81, located on the other side of the passage, may contact the paper-fetching roller 11 or may be separate from it. The force of friction between the platen 12 and the cheque is greater than that between the cheques.

In the embodiment, the paper-fetching roller 11 is located on one side of the U-shaped paper passage Q adjacent to the first movable frame body 82, and the platen 12 is located on the other side of the U-shaped paper passage Q away from the first movable frame body 82. The platen driving component is installed on the fixed frame body 81, configured to drive the platen 12 away from the paper-fetching roller 11 when there is no cheque at the inlet A1, so as to place the cheque to be processed between the platen and the paper-fetching roller. One end of the elastic element 13 is connected with the platen 12, and the other end is connected with the fixed frame body 81. Under the action of the elastic element 13, the platen 12 always has the trend of motion of pressing the paper-fetching roller 11. When a stack of cheques is placed between the platen 12 and the paper-fetching roller 11, the platen 12 presses the stack of cheques on the paper-fetching roller 11 under the action of the elastic element 13. When the paper-fetching roller 11 rotates, since the force of friction between the paper-fetching roller 11 and the cheque is greater than that between the cheques, and the force of friction between the platen 12 and the cheque is greater than that between the cheques, the cheques contacting the paper-fetching roller 11 are conveyed downstream, and the cheques contacting the platen 12 are prevented from being conveyed.

The paper-separating mechanism 2 comprises a paper-separating roller 21 and a paper-pressing member 22, both of which are tangent to each other. The paper-separating roller 21 is supported by the fixed frame body 81, the axis of which is parallel to the axis of the paper-fetching roller 11. The paper-separating roller 21 is located on one side of the U-shaped paper passage Q, connected with the driving mechanism, rotatable around its own axis under the drive of the driving mechanism. The force of friction between the paper-separating roller 21 and the cheque is greater than that between the cheques. The paper-pressing member 22 is located on the other side of the U-shaped paper passage Q, provided tangent to the paper-separating roller 21. The paper-pressing member 22 may be a belt, a rubber belt or other material. The force of friction between the paper-pressing member 22 and the cheque is greater than that between the cheques.

In the embodiment, the paper-separating roller 21 is located on one side of the U-shaped paper passage Q adjacent to the first movable frame body 82, and the paper-pressing member 22 is located on the other side of the U-shaped paper passage Q away from the first movable frame body 82. When multiple cheques are fed between the paper-separating roller 21 and the paper-pressing member 22, since the force of friction between the paper-separating roller 21 and the cheque is greater than that between the cheques, and the force of friction between the paper-pressing member 22 and the cheque is greater than that between the cheques, the cheques contacting the paper-separating roller 21 are conveyed downstream, and the cheques contacting the paper-pressing member 22 are prevented from being conveyed downstream. Multiple cheques may be placed at the inlet at a time by providing the paper pick-up mechanism and the paper-separating mechanism at the inlet. It can be assured that only one cheque is fed into a curved channel by separating the paper at first level through the paper pick-up mechanism and separating the paper at second level through the paper-separating mechanism. Therefore, the user friendliness of the cheque processing device is improved.

Figure 6:
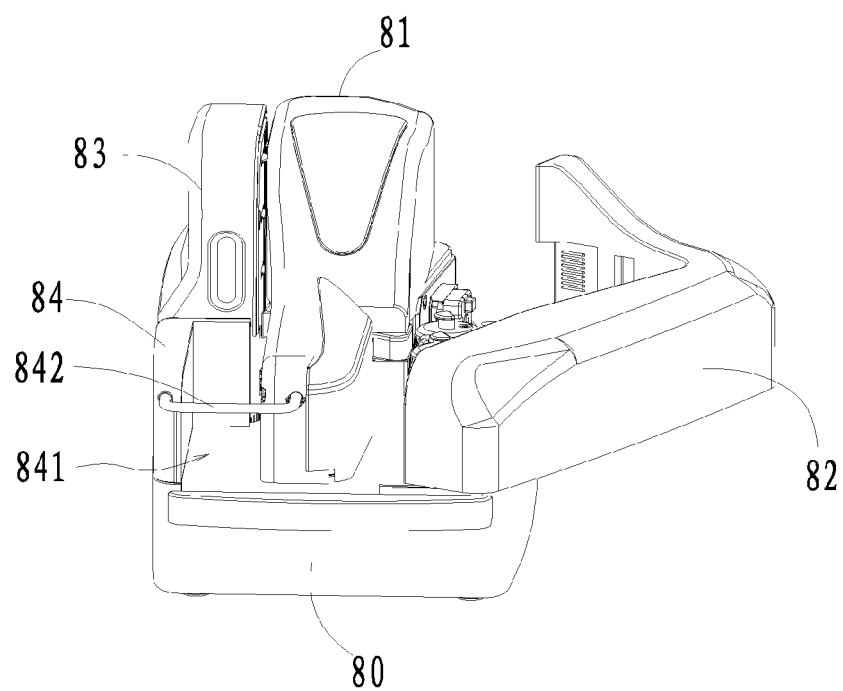
FIG. 6 is elevation II of a cheque processing device according to a first embodiment of the invention.

Further, as shown in FIG. 6, a third frame body 84 forming an accommodating groove 841 is provided between the outlet of the U-shaped paper passage and the fixed frame body 81, wherein a stop lever 842 is provided at a gap of the accommodating groove 841 for storing a stack of cheques.

Figure 7:
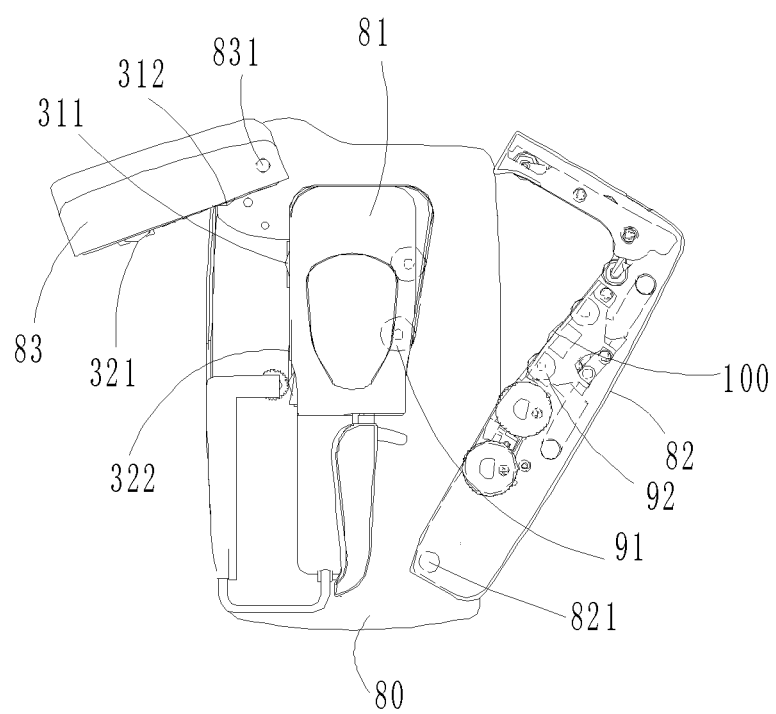
FIG. 7 is a top view of a cheque processing device according to a second embodiment of the invention.

FIG. 7 is a top view of a cheque processing device according to a second embodiment of the invention. The embodiment is different from the above embodiment in that, in the embodiment, the magnetic head is provided on one of the first movable frame body 82 or the fixed frame body 81, the ink cartridge 201 of the printing mechanism is provided on the other of the first movable frame body 82 or the fixed frame body 81, the driving roller 91 of each set of conveying roller assemblies 9 is provided on one of the first movable frame body 82 or the fixed frame body 81, and the driven roller 92 thereof is provided on the other of the first movable frame body 82 or the fixed frame body 81.

In the embodiment, the magnetic head is provided on the first movable frame body 82, the ink cartridge 201 is provided on the fixed frame body 81, the driving roller 91 of each set of conveying roller assemblies 9 is provided on the fixed frame body 81, and the driven roller 92 thereof is provided on the first movable frame body 82. When the first movable frame body 82 rotates around the first pivoting shaft 821, the second movable frame body 83 rotates around the second pivoting shaft 831, and both are opened with respect to the fixed frame body 81, the U-shaped paper passage Q is opened completely, and the components located on the both sides of the U-shaped paper passage Q are separate and exposed completely.

In the cheque processing device provided by the embodiment, the curved channel may be opened completely when the first movable frame body 82 and the second movable frame body 83 are opened with respect to the fixed frame body 81, so that the components such as the ink cartridge, the magnetic head, the image sensor or the like are replaced and cleaned conveniently. Therefore, the maintainability of the device is improved.

Figure 8:
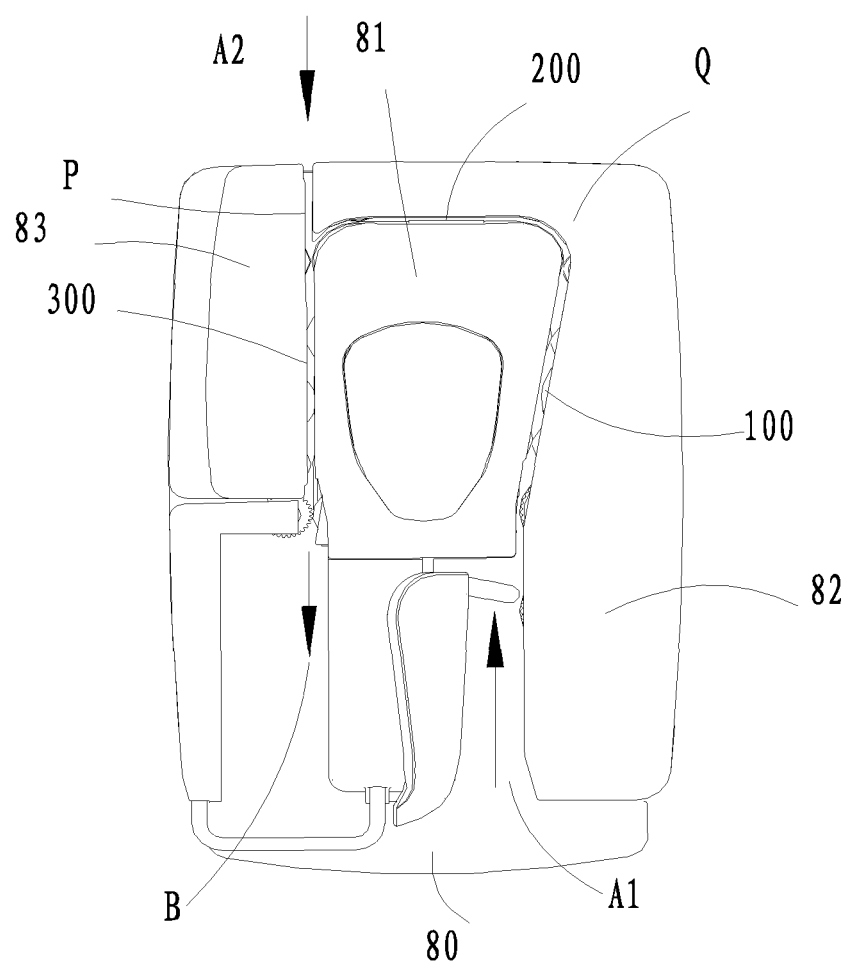
FIG. 8 is a top view of a cheque processing device according to a third embodiment of the invention.

FIG. 8 is a top view of a cheque processing device according to a third embodiment of the invention. As shown in FIG. 8, the embodiment is different from the above embodiment in that, in the embodiment, when the first movable frame body 82 and the second movable frame body 83 are closed with respect to the fixed frame body 81, the first movable frame body 82 and the second movable frame body 83 are spaced apart by a set distance in a abutting place, and an inlet A2 is formed therebetween. Therefore, the U-shaped paper passage Q comprises an L-shaped curved channel formed between the first movable frame body 82 and the fixed frame body 81 and an I-shaped straight channel P formed between the second movable frame body 83 and the fixed frame body 81. A sheet of hard medium such as identity card, ID card or the like may be fed into the I-shaped straight channel P via the inlet A2, and then discharged from the outlet B after the image on the single medium is scanned by the scanning mechanism 300.

In the embodiment, the inlet is provided in the place where the first movable frame body 82 and the second movable frame body 83 are abutted, so that the cheque processing device may scan a sheet of hard medium such as identity card, ID card or the like, thereby increasing the function of the cheque processing device.

The above are only the preferred embodiment of the invention and are not intended to limit the invention, and for those skilled in the art, various changes and variations can be made to the invention. Any modifications, equivalent replacements, improvements and the like within the spirit and principle of the invention shall be contained within the scope of protection of the claims of the invention.

The invention claimed is:

1. A cheque processing device, comprising:
a base,
a frame located at the top face of the base and forming a U-shaped paper passage, and
multiple sets of conveying roller assemblies and multiple processing mechanisms provided along the U-shaped paper passage,
wherein one end of the U-shaped paper passage is an inlet and the other end is an outlet,
wherein the frame comprises a fixed frame body, and a first movable frame body and a second movable frame body which are on the outside of the fixed frame body, only the first movable frame body and the second movable frame body forming the U-shaped paper passage together with the fixed frame body, the first movable frame body and the second movable frame body being directly pivotable on the base to open and close with respect to the fixed frame body,
wherein at least some of the multiple sets of conveying roller assemblies and the multiple processing mechanisms are in an exposed state when the first movable frame body and/or the second movable frame body is/are opened with respect to the fixed frame body,
wherein the first movable frame body is approximately L-shaped as a whole when seen from above and extends along a first side and a second side of the fixed frame body, and the second movable frame body is approximately I-shaped as a whole when seen from above and extends along a third side of the fixed frame body, wherein the first side, the second side and the third side of the fixed frame body are connected end to end orderly and U-shaped, wherein a straight channel of the U-shaped paper passage is formed between the second movable frame body and the fixed frame body, wherein when the first movable frame body and the second movable frame body are closed with respect to the fixed frame body, the first movable frame body and the second movable frame body are spaced apart by a set distance to form a straight inlet paper passage there between, and wherein the straight inlet paper passage merges with the straight channel of the U-shaped paper passage.

2. The cheque processing device according to claim 1, wherein the pivoting position of the first movable frame body is close to the inlet of the U-shaped paper passage, and the pivoting position of the second movable frame body is close to the inlet of the straight channel.

3. The cheque processing device according to claim 1, wherein a scanning mechanism is provided in the straight channel, and the scanning mechanism comprises a first scanning module configured to scan an image on a first face of a cheque and a second scanning module configured to scan an image on a second face of the cheque.

4. The cheque processing device according to claim 1, wherein a reading magnetic mechanism and a printing mechanism are provided between the inlet of the U-shaped paper passage and the straight channel orderly.

5. The cheque processing device according to claim 1, wherein the processing mechanisms and the conveying roller assemblies located at the first side and/or the second side of the fixed frame body are all provided on the fixed frame body and/or the base.

6. The cheque processing device according to claim 1, further comprising a paper pick-up mechanism provided at the inlet of the U-shaped paper passage, wherein the paper pick-up mechanism comprises a paper-fetching roller, a movable platen, and an elastic element configured to bias the platen to the paper-fetching roller.

7. The cheque processing device according to claim 6, further comprising a paper-separating mechanism located downstream of the paper pick-up mechanism, wherein the paper-separating mechanism comprises a paper-separating roller and a paper-pressing member.

8. The cheque processing device according to claim 1, further comprising a third frame body forming an accommodating groove between the outlet of the U-shaped paper passage and the fixed frame body, wherein a stop lever is provided at a gap of the accommodating groove.

* * * * *